United States Patent
Wong

(10) Patent No.: US 8,858,738 B2
(45) Date of Patent: Oct. 14, 2014

(54) METHODS FOR FABRICATION OF IMPROVED ELECTROLYTIC CAPACITOR ANODE

(75) Inventor: James Wong, Shrewsbury, MA (US)

(73) Assignee: Composite Materials Technology, Inc., Shrewsbury, MA (US)

( * ) Notice: Subject to any disclaimer, the term of this patent is extended or adjusted under 35 U.S.C. 154(b) by 698 days.

(21) Appl. No.: 11/859,687

(22) Filed: Sep. 21, 2007

(65) Prior Publication Data

US 2008/0072407 A1 Mar. 27, 2008

Related U.S. Application Data

(60) Provisional application No. 60/827,036, filed on Sep. 26, 2006.

(51) Int. Cl.
*C22F 1/10* (2006.01)

(52) U.S. Cl.
USPC ............... 148/527; 29/25.03; 428/613

(58) Field of Classification Search
USPC ............... 148/527; 29/25.03; 428/613
IPC ........................ H01L 39/248,25/0657
See application file for complete search history.

(56) References Cited

U.S. PATENT DOCUMENTS

| | | | |
|---|---|---|---|
| 3,218,693 A | 11/1965 | Allen et al. ............ 29/155.5 |
| 3,277,465 A | 10/1966 | Weber ................ 29/419 |
| 3,277,564 A | 10/1966 | Webber et al. ........... 29/419 |
| 3,379,000 A | 4/1968 | Webber et al. ........... 57/139 |
| 3,394,213 A | 7/1968 | Roberts et al. ........... 264/174 |
| 3,429,032 A | 2/1969 | Martin et al. ........... 29/599 |
| 3,540,114 A | 11/1970 | Roberts et al. ........... 29/419 |
| 3,567,407 A | 3/1971 | Yoblin ................ 29/191.4 |
| 3,698,863 A | 10/1972 | Roberts et al. .......... 29/183.5 |
| 3,742,369 A | 6/1973 | Douglass ............ 317/230 |
| 3,743,986 A | 7/1973 | McInturff et al. ........ 335/216 |
| 3,743,989 A | 7/1973 | Nicolas et al. ........... 336/5 |
| 3,800,061 A | 3/1974 | Larson et al. ............ 174/15 |
| 4,055,887 A | 11/1977 | Meyer ................ 29/599 |
| 4,224,087 A | 9/1980 | Tachikawa et al. ........ 148/98 |
| 4,502,884 A | 3/1985 | Fife ................ 75/0.5 AB |
| 4,611,390 A * | 9/1986 | Tanaka et al. ........... 29/599 |
| 4,746,581 A | 5/1988 | Flukiger .............. 428/614 |
| 4,767,470 A | 8/1988 | Tachikawa et al. ........ 148/98 |

(Continued)

FOREIGN PATENT DOCUMENTS

JP  S52-035744  3/1977
JP  2106885 A2  4/1990

(Continued)

OTHER PUBLICATIONS

"Alternative Materials for Electrolytic Capacitor" Reichert et al., T.I.C. Bulletin, No. 109, Mar. 2002.

(Continued)

*Primary Examiner* — Weiping Zhu
(74) *Attorney, Agent, or Firm* — Hayes Soloway P.C.

(57) ABSTRACT

A process of forming porous electrolytic electrode in which alternating layers of a valve metal and a ductile metal are combined to form a billet, and the billet mechanically reduced by exclusion and drawing prior to etching. One or more slots are formed in the billet prior to the mechanical reducing, and filled with the ductile metal.

18 Claims, 3 Drawing Sheets

(56) References Cited

U.S. PATENT DOCUMENTS

| | | | |
|---|---|---|---|
| 4,776,899 A | 10/1988 | Murase et al. | 148/98 |
| 4,977,039 A | 12/1990 | Onishi et al. | 428/623 |
| 5,034,857 A | 7/1991 | Wong | 362/509 |
| 5,174,831 A | 12/1992 | Wong et al. | 148/98 |
| 5,217,526 A | 6/1993 | Fife | 75/229 |
| 5,223,348 A | 6/1993 | Wong et al. | 428/635 |
| 5,245,514 A | 9/1993 | Fife et al. | H01G 9/05 |
| 5,284,531 A | 2/1994 | Fife | 148/513 |
| 5,299,728 A | 4/1994 | King et al. | 228/179.1 |
| 5,306,462 A | 4/1994 | Fife | 419/24 |
| 5,505,790 A | 4/1996 | Benz et al. | 148/98 |
| 5,534,219 A | 7/1996 | Marancik et al. | 419/4 |
| 5,540,787 A | 7/1996 | Johnson et al. | 360/97 |
| 5,541,787 A | 7/1996 | Jabbari et al. | 360/97.01 |
| 5,554,448 A | 9/1996 | Yamada et al. | 428/662 |
| 5,869,169 A | 2/1999 | Jones | 428/213 |
| 5,869,196 A * | 2/1999 | Wong et al. | 428/613 |
| 5,963,417 A | 10/1999 | Anderson et al. | H01G 9/00 |

FOREIGN PATENT DOCUMENTS

| | | | |
|---|---|---|---|
| JP | 2197017 A | 8/1990 | |
| JP | 3208279 A | 9/1991 | |
| JP | 4033272 A | 2/1992 | |
| JP | 11-250747 | 9/1999 | H01B 13/00 |
| JP | 2001-509739 | 7/2001 | |
| WO | WO 98/28129 | 7/1998 | |
| WO | WO 00/63456 | 10/2000 | C23C 2/00 |
| WO | WO 02/45106 | 6/2002 | H01G 9/00 |
| WO | WO 2004/059754 | 7/2004 | |

OTHER PUBLICATIONS

Scanlan et al, "Multifilamentary Nb3Sn for Superconducting Generator Applications", IEEE Trans. MAG-11, Mar. 1975 pp. 287-290.

"Development of Internal-Tin Diffucion Multifilamentary Nb3Sn Conductors Including Hydrostatic Extrusion" Xu et al., IEEE Transactions on Magnetics, vol. 24, No. 2, Mar. 1999=8, p. 1127-1130.

Sakamoto et al., Very High Critical Current Density of Bronze-Processed (Nb,Ti)3Sn Superconducting Wire IEEE Transactions on Applied Superconductivity, vol. 10, No. 1, Mar. 2000, pp. 971-974.

Smathers et al. "A15 Superconductors", Metals Handbook, Tenth Edition, vol. 2, pp. 1060-1077.

Rosner et al, "Review of Superconducting Activities at IGC on A-15 Conductors", Filamentary A-15 Superconductors, Plenum Press, NY published 1980, pp. 67-79.

Naus et al, The Interdiffusion of Cu and Sn in Internal Sn Nb3Sn Superconductors, IEEE Transaction ASC, vol. 10 No. 1 pp. 983-987.

Caslaw, J. S., Enhancement of the critical current density in niobium—tin, Cryogenics, Feb. 1971, pp. 57-59.

Caslaw, J.S., "The Influence of Liquid Metal Infiltration on Superconducting Characteristics of Niobium Nitride", Advanced in Cryogenic Eng., vol. 34, pp. 835-842, 1987.

Tachikawa, K., Developments of A15 Filamentary Composite Superconductors in Japan by Masaki Suenaga and Alan F. Clark, Plenum Press, NY, Cryogenic Mat. Series 1980, pp. 1-15.

Katagiri et al, "Tensile Strain/Transverse Compressive Stress Effects in Nb3Sn Multifilamentary Wires with CuNb Reinforcing Stabilizer" Advanced in Cryogenic Eng., vol. 42, Plenum Press NY, pp. 1423-1432.

Dew-Hughes et al, "Treatise on Material Science and Technology", vol. 14, Metallurgy of Superconducting Materials, 1979 pp. 429-432.

Valder, B., "Niobium Alloy C-103/Aerospace Applications" Wah Chang, Outlook 1st Quarter 2000.

Rumaner et al, Effect of Oxygen and Zirconium on the Growth and Superconducting Properties of Nb3Sn, Metallurgical and Materials Transactions, Vo. 25A, Jan. 1994, pp. 203-211.

Xu et al, "Development of Internal-Tin Diffusion Mulitfilamentary Nb3Sn Conductors including Hydrostatic Extrusion", IEEE Transactions on Magnetics, vol. 24, No. 2, Mar. 1988. pp. 1127-1130.

"Anisotropy of Optimized and Not Optimized Technical NbTi Superconductors" Best et al., IEEE Transactions on Magnetics, vol. Mag-15, No. 1, Jan. 1979, pp. 765-767.

"Anisotropy of the Critacal Current in Solid Solution Superconductor NbTi" Best et al., IEEE Transations on Magnetics, vol. Mag-15, No. 1, Jan. 1979, pp. 395-397.

Japanese Office Action, dated Apr. 23, 2012, with English Translation (6 pages).

Chinese Office Action, dated Jun. 2, 2011, with English Translation (11 pages).

Chinese Office Action, dated Nov. 1, 2010, with English Translation (13 pages).

European Supplementary Search Report, Appln. No. 07843025.3-2208/2076911 (9 pgs), Oct. 5, 2012.

* cited by examiner

METHODS FOR FABRICATION OF IMPROVED ELECTROLYTIC CAPACITOR ANODE

CROSS REFERENCE TO RELATED APPLICATION

This application claims priority from U.S. Provisional Patent Application Ser. No. 60/827,036, filed Sep. 26, 2006, the contents of which are incorporated herein by reference.

TECHNICAL FIELD

The present invention relates to the production of electrolytic materials. The invention has particular applicability to production of tantalum-based materials useful as electrolytic capacitor anodes and will be described in connection with such utilities, although other utilities are contemplated.

BACKGROUND ART

Tantalum-based electrolytic capacitors have found increasing use in microelectronics. The combination of small package size, insensitivity to operating temperature, and excellent reliability have made them the choice over ceramic multilayer and aluminum foil-based capacitors for many applications. As the state of the art in microelectronics continues to progress, demand has grown for smaller, more cost-effective tantalum electrolytic capacitors. This demand entails improvements in the quality and performance of the tantalum compacts that are at the heart of such capacitors.

Standard Industry Practice

Heretofore, electrolytic tantalum capacitors have primarily been fabricated using fine particle tantalum powder. The powder is pressed into a green compact (20 to 50 percent dense) and is sintered under vacuum at a temperature of 1500°-2000° C. for 15-30 minutes to form a porous, mechanically robust body in which the tantalum is electrically continuous. The sintering process is, in some cases, relied upon to attach a lead wire to the compact. In these cases, the lead is inserted into the green compact prior to sintering. If the lead is not attached in this manner, it usually will be welded into place immediately following sintering of the compact. An important ancillary benefit of the sintering operation is purification of the tantalum particle surfaces; impurities, such as oxygen, are driven off.

After sintering, the compact is anodized to form the dielectric tantalum pentoxide ($Ta_2O_5$) on the exposed surfaces. The porous regions of the anodized compact are then infiltrated with a conductive electrolyte. Typically, manganese dioxide ($MnO_2$) or sulfuric acid is used as the electrolyte. In the case of $MnO_2$, a manganese nitrate solution is infiltrated and then thermally decomposed into $MnO_2$. The final capacitor manufacturing stages are assembly of a current collector and packaging of the capacitor.

Powder Manufacturing

State of the art tantalum powder is produced by the sodium reduction process of $K_2TaF_7$. Improvements in the process have resulted in commercially available powders capable of yielding a specific capacitance of over 23,000 CV/g. Better control of input tantalum particle size, reaction temperature, and other variables has led to the improvements in specific capacitance. A key advance was the introduction of doping agents that enabled the production of very high specific capacitance powders. The doping agents serve to prevent surface loss during sintering. Typical additives are nitrogen, oxygen, sulfur, and phosphorus compounds in the range from 50 to 500 ppm. While select dopants are beneficial, it is important to limit other contamination, which can weaken the dielectric film or even prevent the formation of a continuous $Ta_2O_5$ layer that could lead to premature breakdown of the dielectric film and loss of capacitance.

Higher capacitance tantalum particles have been obtained by ball milling powders. Ball milling turns the roughly spherical powder particles into flakes. The benefit is that the flakes have a higher surface-area-to-volume ratio than do the powder particles. This translates into greater volumetric efficiency for the flakes when they are formed into anodes. Aspecting tantalum particles by ball milling and other processes aimed at improving powder performance, while effective, have practical drawbacks, including increased manufacturing costs and a marked decrease in product yield. Currently, a premium of 2-3 times is charged for the very highest capacitance powders over standard product.

The very fine tantalum powders commercially available today have several serious problems with respect to anode fabrication. One significant problem in particular is a sensitivity to surface area loss during sintering. Ideal sintering conditions are high temperatures and short times. A higher temperature serves to purify the tantalum surface and provide a mechanically strong compact. Capacitors having lower equivalent series resistance (ESR) and equivalent series inductance (ESL) can be fabricated if higher sintering temperatures are employed. Unfortunately, the fine particles of high capacitance powders and flakes lose surface area at temperatures over 1500° C. A loss of surface area results in lower capacitance, reducing the benefit of using the higher specific capacitance powder. The capacitor manufacturer must balance sintering temperature, mechanical properties, and ESR and ESL levels in order to maximize capacitor performance.

Fine powders and flakes are also sensitive to forming voltage during anodization. The anodization process consumes some of the metallic tantalum to form the dielectric layer. As the forming voltage increases, more of the tantalum is consumed, resulting in a loss of capacitance. As the powder becomes finer, this problem becomes increasingly serious.

In practice today, high surface area powders are sintered at low temperatures (below 1500° C.) and are anodized at voltages below 50 volts. Most of these capacitors are restricted to operating voltages below 16 volts.

Another drawback to fine powders is "tortuousity", which can lead to poor electrolyte fill factor. As particle size is reduced, the pathways that the electrolyte must follow to infiltrate the compact grow increasingly narrow and more convoluted, or tortuous. Eventually, it becomes extremely difficult, if not impossible, to completely infiltrate the compact. Incomplete infiltration results in lower capacitance.

A final difficulty in using high specific capacitance tantalum powders is their poor flowability. In state of the art capacitor manufacturing processes, tantalum powder is metered into a die for pressing into the green compact. It is very important that the metering process is accurate and reliable in order that each capacitor contains the same quantity of powder. Flakes and highly aspected powders tend not to flow uniformly, which can lead to large variability in production runs.

Fiber Production

In my prior U.S. Pat. No. 5,034,857, I disclose an approach to the production of very fine valve metal filaments, preferably tantalum, for capacitor use. The benefits of fine filaments relative to fine powders are higher purity, lower cost, uniformity of cross section, and ease of dielectric infiltration, while still maintaining high surface area for anodization. The uniformity of cross section results in capacitors with high specific capacitance, lower ESR and ESL, and less sensitivity to forming voltage and sintering temperature as compared to fine powder compacts.

As disclosed in my aforesaid '857 U.S. patent, valve metal filaments, preferably tantalum, are fabricated through the combination of the filaments with a ductile metal so as to form a billet. The second, ductile metal is different from the metal that forms the filaments. The filaments are substantially parallel, and are separated from each other and from the billet surface by the second, ductile metal. The billet is reduced by conventional means—e.g., extrusion and wire drawing—to the point where the filament diameter is in the range of 0.2 to 5.0 microns in diameter. At that point, the second, ductile metal is removed, preferably by leaching in mineral acids, leaving the valve metal filaments intact. The filaments are suitable for use in tantalum capacitor fabrication. The present invention extends the technology disclosed in my aforesaid '857 U.S. patent.

Other patents involving valve metal filaments and fibers, their fabrication, or articles made therefrom include U.S. Pat. No. 3,277,564, (Webber), U.S. Pat. No. 3,379,000 (Webber), U.S. Pat. No. 3,394,213, (Roberts), U.S. Pat. No. 3,567,407 (Yoblin), U.S. Pat. No. 3,698,863 (Roberts), U.S. Pat. No. 3,742,369 (Douglass), U.S. Pat. No. 4,502,884 (Fife), U.S. Pat. No. 5,217,526 (Fife), U.S. Pat. No. 5,306,462 (Fife), U.S. Pat. No. 5,284,531 (Fife), and U.S. Pat. No. 5,245,514 (Fife).

The foregoing discussion of the prior art derives in part from my earlier U.S. Pat. No. 5,869,196 in which I describe a process for fabrication of fine-valve metal filaments for use as porous metal compacts used in the manufacture of electrolytic capacitors. According to my '196 U.S. patent, a metal billet consisting of multiple filaments of a valve metal, preferably tantalum, is contained within and spaced apart by a ductile metal, preferably copper. The billet is reduced by conventional means, such as extrusion and wire drawing, the resulting composite product is cut into lengths, and the ductile metal separating the valve metal components is removed by leaching in acid. A similar compaction technique has been proposed to fabricate composites by providing continuous layers of tantalum and copper sheets layered together in a jellyroll. The jellyroll is then reduced to a small diameter size by extrusion and drawing. Starting with sheets of tantalum and copper offer advantages over working with filaments. However, at reduced sizes, the copper cannot readily be leached out due to the presence of the continuous tantalum layers.

BRIEF SUMMARY OF THE INVENTION

The present invention provides improvements over the prior art such as described above, and in particular the process of my '196 U.S. patent by creating one or more open slots in the starting billet stage and filling the slots with ductile metal prior to extrusion and drawing. After extrusion and drawing to small size, the slots remain. As a result, the ductile metal readily may be leached and removed from between the tantalum layers. The resulting product is a series compacted tantalum layers each progressively of smaller width. In one embodiment of the invention, continuous layers of tantalum and copper are layered together in a jellyroll and formed into a billet which is circular in cross-section, and the slots are concentrically evenly spaced radially around the billet. The resulting product is a series of concentric split tubes each progressively of smaller diameter towards the center.

Employing a foil or sheet of tantalum as opposed to filaments greatly simplifies assembly of the billet. Employing sheet tantalum also ensures greater uniformity since the thickness of the starting sheet can be controlled more readily that using a multiple of separate filaments. This in turn produces substantially more uniform capacitor material resulting in substantially better values of CV/g.

BRIEF DESCRIPTION OF THE DRAWINGS

Further features and advantages of the present invention will be seen from the following detailed description taken in conjunction with the accompanying drawings, wherein.

DETAILED DESCRIPTION OF PREFERRED EMBODIMENTS

Figure 2:
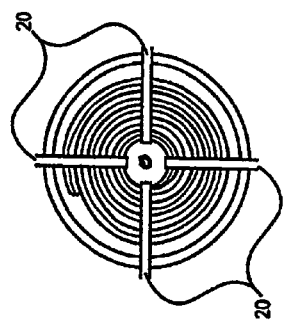
FIG. 2 is a view similar to FIG. 1 at a next stage.
Figure 1:
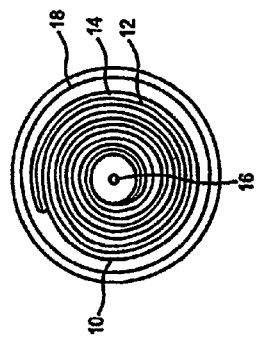
FIG. 1 is a cross-sectional view of primary billet used in one embodiment of the present invention at an early stage in the process.
Figure 3:
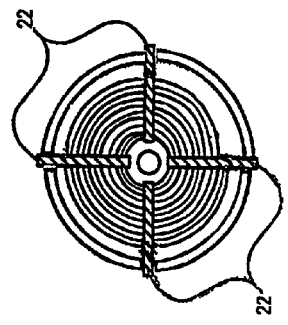
FIG. 3 is a view similar to FIG. 2 at a next stage in the process.
Figure 4:
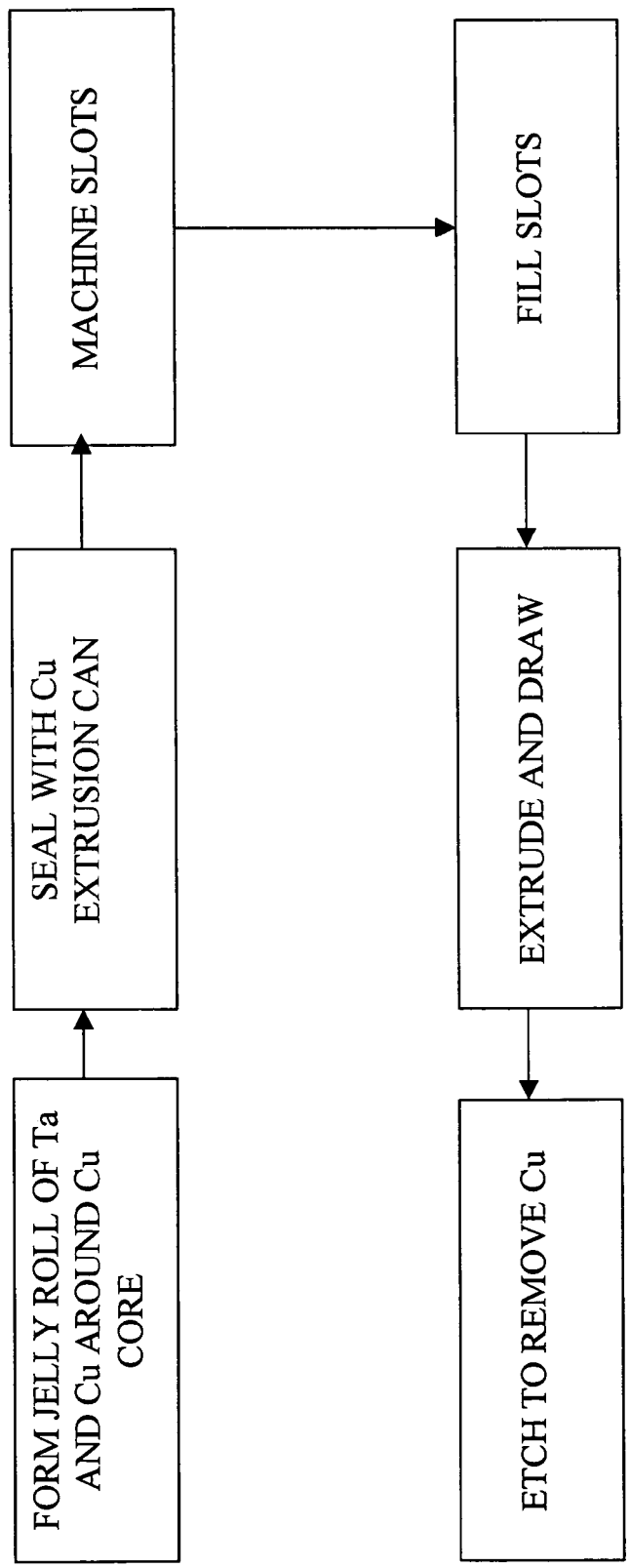
FIG. 4 to is schematic block diagram of the process of the present invention.

Referring to FIGS. 1-4, in a preferred embodiment to the present invention, the process starts with the creation of a jellyroll 10 formed of tantalum 12 and copper 14 sheets wound around a copper core 16. The jellyroll 10 is sealed within a copper extrusion can 18, and a plurality of slots 20 are machined radially along the length of the billet (FIG. 2), the slots are then filled with copper filler material 22 (FIG. 3).

The billet is evacuated and extruded and drawn using normal processing procedures. For example, extrusion may be conducted at 1400° F. for 16 times reduction, and drawn to final size. The billet is extruded and drawn until the tantalum sheets are reduced to about 1 to 0.2 micron thickness. The composite product is then cut into one-foot lengths and then subjected to etching. The copper slots permit the leachant to remove the copper from between the tantalum layers.

After leaching, one is left with a series of highly compact concentric split tubes, each progressively smaller in diameter towards the center, and evenly spaced apart. Assuming, for example, equal thickness of tantalum and copper sheets, the volume ratio/thickness would be 50 percent or 50 percent of theoretical density. Such density would not require any further compaction for use as a capacitor.

The following example illustrates the present invention.

Example I

A 0.381 millimeter thick copper sheet and a 0.305 millimeter thick tantalum sheet were wrapped in jellyroll fashion around a 2.54 centimeter round copper rod to form a jellyroll approximately 3.30 centimeters in diameter. The jellyroll was placed in a copper extrusion can and a nose and tail welded in place. Four radial slots 2.20 millimeters wide were machined at 90° spacing through the periphery of the can to the copper rod. The slots were then backfilled with copper which was sealed to the copper can by welding.

The resulting billet was then extruded and drawn to a diameter of 0.127 millimeters. The resulting extruded and drawn rod was then submerged in a solution of one part nitric acid to one part water to leach away the copper. The resulting tantalum filaments were then vacuum sintered at 1500° C. for 20 minutes. The resulting tantalum segments were approximately 1 micron in thickness having the shape of segments of a split tube.

Example II

Figure 5:
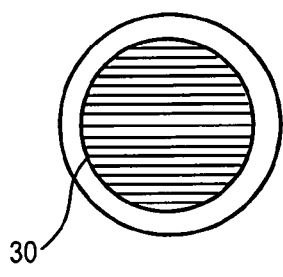
FIGS. 5-11 are cross-sectional views of primary billets in accordance with other embodiments of the invention.
Figure 6:
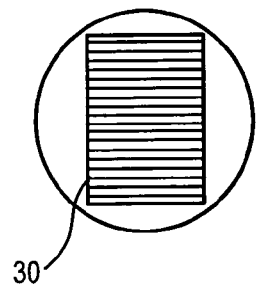
Figure 7:
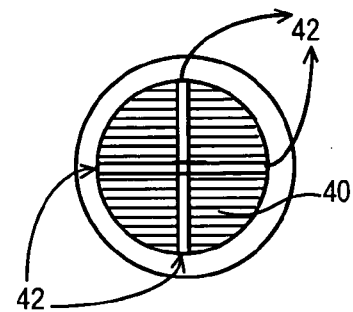
Figure 8:
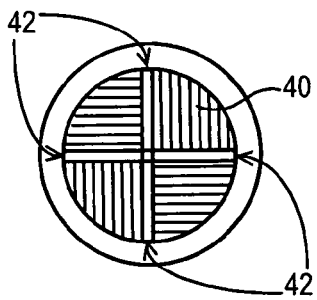
Figure 9:
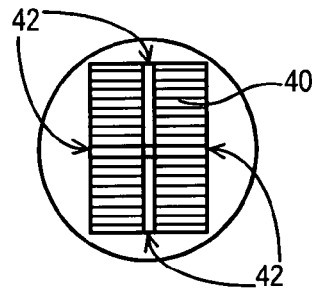
Figure 10:
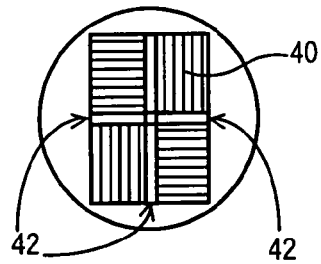

In addition to the jellyroll design of Example I, several other modifications are possible. For example, alternating tantalum and copper sheets can be formed as stacks 30 in flat orientation as is shown in FIGS. 5-6, and placed in copper extrusion cans and a nose and tail welded in place. Four radial slots (not shown) may then be machined at 90° spacing through the periphery of the can, the slots filled with copper, and the resulting billet can be extruded and drawn as following the procedure described in Example I. The resulting extruded and drawn rod may then be submerged in a solution of nitric acid to leach away the copper, and the resulting tantalum filaments may then be vacuum sintered as in Example I.

Example III

Figure 11:
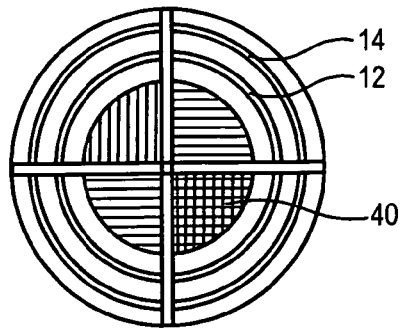

Alternatively, alternating tantalum and copper sheets can be stacked in packets 40 which are then arranged together, separated by continuous copper sheets 42 in various orientations, placed in copper extrusion cans as shown in FIGS. 7-10, and a nose and tail welded in place. Alternatively, stacks of tantalum and copper sheets may be surrounded by a jellyroll formed of alternating layers of tantalum and copper, e.g. as shown in FIG. 11.

The resulting billets may then be extruded and drawn, subjected to copper leaching and sintering following the procedure of Example I.

Restacking rods of Examples I and II at larger diameter can also be used in a second extrusion billet and would facilitate the production of larger quantities of tantalum fibers.

ADVANTAGES OF THE INVENTION

The present invention provides several advantages over the prior art as follows:

(1) Instead of using a large number of individual filaments, continuous tantalum sheets may be used. This greatly simplifies the assembly of the billet, and also ensures greater uniformity of the finished product.

(2) The final packaging is also made easier by significantly reducing the number of filaments. Improvements in equivalent series resistance (ESR) are now possible due to the increased connection because of the jellyroll designs.

(3) Substantially better CV/g values also can be achieved due to uniformity of tantalum elements.

(4) The process ensures cross-sectional uniformity and high surface-to-volume ratio. Both factors are important for reliable fabrication of high capacitance capacitors on an industrial scale.

(5) The resulting wire can be used in the round condition or may be rolled/twisted and then rolled. Additionally, multiple strands can be assembled, for example by braiding or cabling for higher capacitance capacitors.

(6) When rolled, the aspected wire will assume the shape of a chip capacitor as currently used in the commercial market.

(7) The process is flexible. By modifying the primary billet design, one can have as much or as little tantalum as desired in whatever volume density within the sheath one desires.

(8) The process is economical as compared to other processes employing powders or filaments.

While the invention has been described in connection with the use of tantalum and copper, other valve metals, such as niobium or an alloy of tantalum or niobium, and other ductile metals such as aluminum or lead can be used. Also, fewer or greater than 4 slots may be machined in the billet. Still other changes may be made without departing from the spirit and scope of the invention.

I claim:

1. A method of forming a porous electrolytic electrode in which alternating layers of valve metal and ductile metal are combined to form a billet comprising a metal core, and the billet mechanically reduced by extrusion and drawing prior to etching, wherein said valve metal layers comprise continuous sheets, and one or more slots are formed such that the one or more slots runs radially from a periphery of the billet to the metal core both through the valve metal layers and the ductile metal layers in the billet prior to the mechanical reducing.

2. The method of claim 1, wherein said valve metal comprises tantalum and said ductile material comprises copper.

3. The method of claim 1, wherein a plurality of said slots are formed equispaced around the periphery of the billet.

4. The method of claim 3, wherein the billet has a circular cross-section, and the slots are formed radially to the periphery of the billet.

5. The method of claim 1, wherein four slots are formed spaced approximately 90° apart around the billet.

6. The method of claim 1, wherein the alternating layers are formed in a jellyroll around the core metal.

7. The method of claim 6, wherein the core metal comprises the same metal as the ductile material.

8. The method of claim 7, wherein the ductile metal and the core metal comprise copper.

9. The method of claim 1, wherein the alternating layers are formed as stacked layers.

10. The method of claim 1, wherein a tantalum layer and a copper layer are wrapped around a copper core in jellyroll fashion to form said billet.

11. The method of claim 1, wherein said one or more slots span two or more of said alternating layers.

12. A method of forming a porous electrolytic electrode in which alternating continuous layers of valve metal and ductile metal are stacked to form a billet comprising a metal core, and the billet mechanically reduced by extrusion and drawing prior to etching, wherein said plurality of layers of valve metal are in sheet form, and said stacked layers are slotted such that one or more slots runs radially from a periphery of the billet to the metal core both through the valve metal layers and ductile metal layers to form a plurality of packets, prior to the mechanical reducing, and the ductile metal is removed by etching following the mechanical reducing.

13. In the method of claim 12, wherein said valve metal comprises tantalum and said ductile material comprises copper.

14. In the method of claim 12, wherein the ductile metal comprises copper.

15. In the method of claim 12, wherein the ductile metal layer comprises a continuous metal sheet.

16. In the method of claim 12, wherein a plurality of packets are combined in a stack, and separated by a sheet of copper.

17. In the method of claim 12, wherein a plurality of packets are arranged in different orientations relative to one another, and separated by a sheet of copper.

18. The method of claim 12, wherein said slots are formed spanning two or more of said alternating layers.

* * * * *